US012308579B2

(12) United States Patent
Long et al.

(10) Patent No.: US 12,308,579 B2
(45) Date of Patent: May 20, 2025

(54) RECEPTACLE CAGE

(71) Applicant: TE Connectivity Services GmbH, Schaffhausen (CH)

(72) Inventors: Richard James Long, Columbia, PA (US); Alex Michael Sharf, Harrisburg, PA (US); Freddy R. Galindo Palomino, Harrisburg, PA (US)

(73) Assignee: TE CONNECTIVITY SOLUTIONS GmbH, Schaffhausen (CH)

(*) Notice: Subject to any disclaimer, the term of this patent is extended or adjusted under 35 U.S.C. 154(b) by 0 days.

(21) Appl. No.: 17/667,109

(22) Filed: Feb. 8, 2022

(65) Prior Publication Data

US 2023/0253739 A1 Aug. 10, 2023

(51) Int. Cl.
*H01R 13/659* (2011.01)

(52) U.S. Cl.
CPC .................................. *H01R 13/659* (2013.01)

(58) Field of Classification Search
CPC .............. H01R 13/659; H01R 13/6591; H01R 13/6593; H01R 13/6595; H01R 13/6596; G02B 6/4278
See application file for complete search history.

(56) References Cited

U.S. PATENT DOCUMENTS

| | | | | |
|---|---|---|---|---|
| 6,943,287 B2 * | 9/2005 | Lloyd | H01R 13/659 439/607.17 |
| 7,845,975 B2 | 12/2010 | Cheng et al. | |
| 2006/0003632 A1 * | 1/2006 | Long | H01R 13/659 439/607.2 |
| 2016/0308313 A1 * | 10/2016 | Yang | G02B 6/0008 |

* cited by examiner

*Primary Examiner* — Renee S Luebke
*Assistant Examiner* — Paul D Baillargeon

(57) ABSTRACT

A receptacle cage includes cage walls including exterior walls and an interior wall. The exterior walls form a cavity and include a top wall, a bottom wall, a first side wall, a second side wall, and a rear wall. The interior wall is received in the cavity and divides the cavity into a first module channel at a first side of the interior wall and a second module channel at a second side of the interior wall. The interior wall includes a front edge, a rear edge, an upper edge, and a lower edge. The upper edge is joined to the top wall along a majority of the upper edge. The lower edge is joined to the bottom wall along a majority of the lower edge. The rear edge is joined to the rear wall along a majority of the rear edge. The exterior walls provide external shielding for the first and second module channels. The interior wall provides shielding between the first and second module channels.

20 Claims, 4 Drawing Sheets

RECEPTACLE CAGE

BACKGROUND OF THE INVENTION

The subject matter herein relates generally to receptacle connector assemblies.

Some communication systems utilize receptacle assemblies having communication connectors to interconnect various components of the system for data communication. The receptacle assemblies include receptacle cages that receive pluggable modules, such as I/O modules, that are electrically connected to the communication connector. The receptacle cages provide electrical shielding, such as EMI shielding, for the pluggable modules. Known receptacle cages are not without disadvantages. For instance, openings or gaps in the walls of the receptacle cage provide areas for potential EMI leakage.

A need remains for a receptacle cage having improved EMI shielding.

BRIEF DESCRIPTION OF THE INVENTION

In one embodiment, a receptacle cage for shielding electrical connections between receptacle connectors and pluggable modules is provided. The receptacle cage includes cage walls extending between a front end and a rear end of the receptacle cage. The cage walls include exterior walls and an interior wall. The exterior walls form a cavity. The exterior walls include a top wall, a bottom wall, a first side wall, a second side wall, and a rear wall. The top and bottom walls extend between the first and second side walls. The rear wall extends between the first and second side walls. The interior wall is received in the cavity and divides the cavity into a first module channel at a first side of the interior wall and a second module channel at a second side of the interior wall. The first and second module channels are configured to receive corresponding pluggable modules. The interior wall includes a front edge, a rear edge, an upper edge, and a lower edge. The upper edge is joined to the top wall along a majority of the upper edge. The lower edge is joined to the bottom wall along a majority of the lower edge. The rear edge is joined to the rear wall along a majority of the rear edge. The exterior walls provide external shielding for the first and second module channels. The interior wall provides shielding between the first and second module channels.

In another embodiment, a receptacle connector assembly is provided and includes a receptacle cage including cage walls extending between a front end and a rear end of the receptacle cage. The cage walls include exterior walls forming a cavity and at least one interior wall in the cavity dividing the cavity into module channels configured to receive corresponding pluggable modules. The exterior walls include a top wall, a bottom wall, a first side wall, a second side wall, and a rear wall. The top and bottom walls extend between the first and second side walls. The rear wall extends between the first and second side walls. Each interior wall includes a front edge, a rear edge, an upper edge, and a lower edge. The upper edge is joined to the top wall along a majority of the upper edge. The lower edge is joined to the bottom wall along a majority of the lower edge. The rear edge is joined to the rear wall along a majority of the rear edge. The receptacle connector assembly includes receptacle connectors received in the module channels for electrical connection with the corresponding pluggable modules. The exterior walls provide external shielding for the module channels and the receptacle connectors received in the module channels. The at least one interior wall provides shielding within the cavity between the module channels.

In a further embodiment, a communication system is provided and includes pluggable modules each including an outer housing extending between a mating end and a cable end. The pluggable module includes an upper wall and a lower wall. The pluggable module has a cavity between the upper wall and the lower wall. The pluggable module has a module circuit board in the cavity include a card edge proximate to the mating end of the outer housing. The communication system includes a receptacle connector assembly including a receptacle cage and receptacle connectors received in the receptacle cage for electrical connection with the corresponding pluggable modules. The receptacle cage have cage walls extending between a front end and a rear end of the receptacle cage. The cage walls include exterior walls forming a cavity and at least one interior wall in the cavity dividing the cavity into module channels. Each module channel receives the corresponding receptacle connector. Each module channel receives the mating end of the corresponding pluggable module for mating with the receptacle connector. The exterior walls include a top wall, a bottom wall, a first side wall, a second side wall, and a rear wall. The top and bottom walls extend between the first and second side walls. The rear wall extends between the first and second side walls. Each interior wall includes a front edge, a rear edge, an upper edge, and a lower edge. The upper edge is joined to the top wall along a majority of the upper edge. The lower edge is joined to the bottom wall along a majority of the lower edge. The rear edge is joined to the rear wall along a majority of the rear edge. The exterior walls provide external shielding for the pluggable modules and the receptacle connectors received in the module channels. The at least one interior wall provides shielding within the cavity between the pluggable modules and the receptacle connectors.

DETAILED DESCRIPTION OF THE INVENTION

Figure 1:
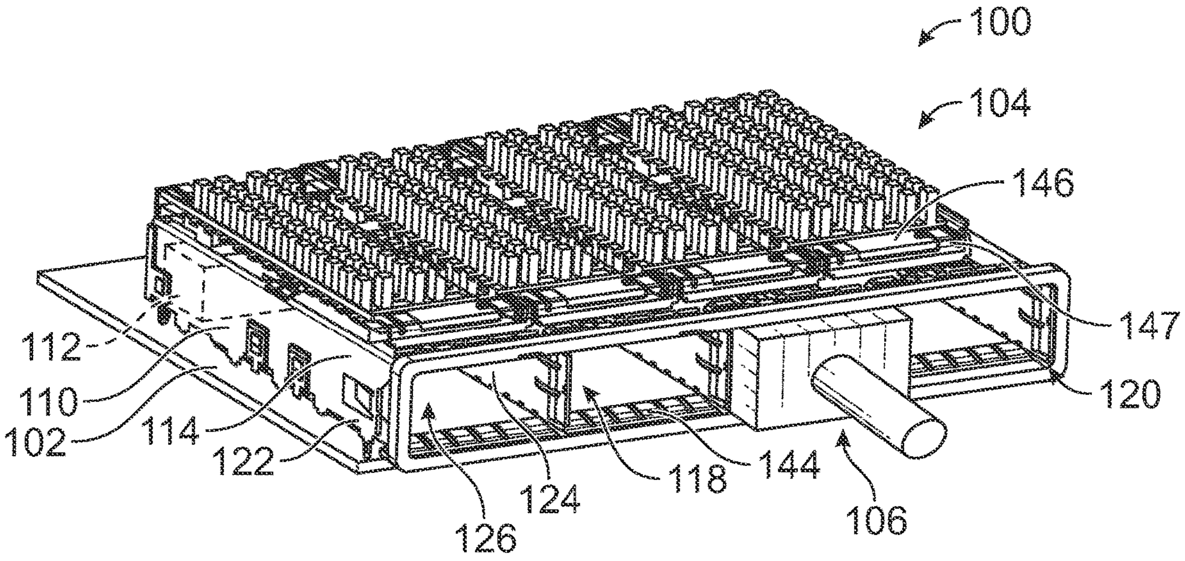
FIG. 1 is a front perspective view of a communication system formed in accordance with an exemplary embodiment.
Figure 2:
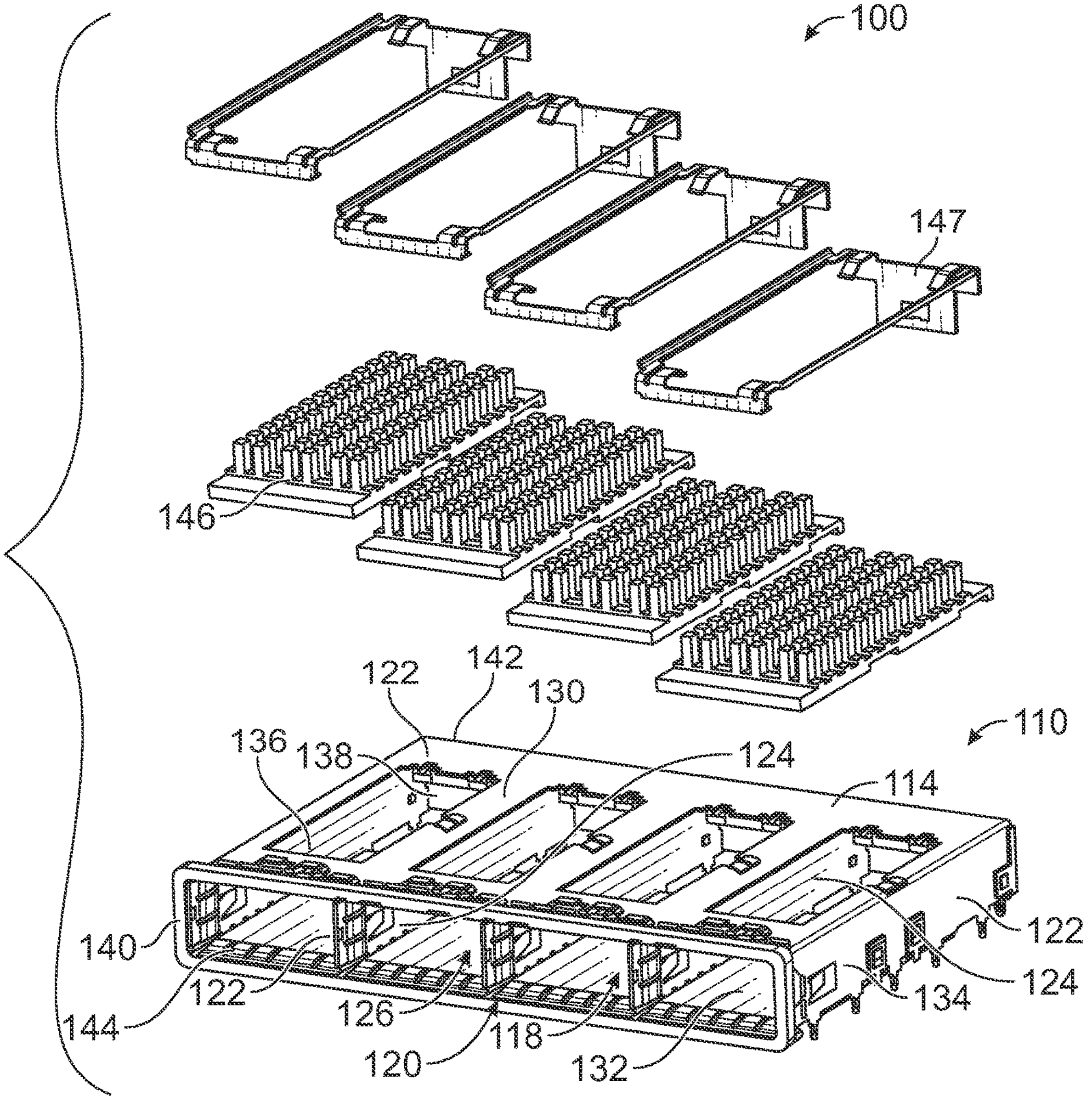
FIG. 2 is an exploded view of a portion of the communication system in accordance with an exemplary embodiment.

FIG. 1 is a front perspective view of a communication system 100 formed in accordance with an exemplary embodiment. FIG. 2 is an exploded view of a portion of the communication system 100 in accordance with an exemplary embodiment. The communication system 100 includes a circuit board 102 and a receptacle connector assembly 104 mounted to the circuit board 102. Pluggable modules 106 are configured to be electrically connected to the receptacle connector assembly 104. The pluggable modules 106 are electrically connected to the circuit board 102 through the receptacle connector assembly 104.

In an exemplary embodiment, the receptacle connector assembly 104 includes a receptacle cage 110 and one or more receptacle connectors 112 (shown in phantom) received in the receptacle cage 110. The receptacle cage 110 surrounds the receptacle connector(s) 112 and provides electrical shielding for the receptacle connector 112. In various embodiments, the receptacle connector 112 is a card edge connector having receptacle contacts arranged along a card slot for electrical connection with the corresponding pluggable module 106. The pluggable modules 106 are loaded into the receptacle cage 110 and are at least partially surrounded by the receptacle cage 110.

The receptacle cage 110 includes a plurality of cage walls 114 forming a cavity 126 that is divided into a plurality of module channels 118. Each module channel 118 receives a corresponding pluggable module 106. The cage walls 114 may be solid walls or may be perforated walls (for example, with small openings) to allow airflow therethrough. The cage walls 114 may have cutouts for a heatsink or heat spreader. In an exemplary embodiment, the cage walls 114 are stamped and formed metallic walls that provide shielding for the pluggable modules 106 and the receptacle connectors 112.

In the illustrated embodiment, the receptacle cage 110 includes a single row of module channels 118. However, in alternative embodiments, the receptacle cage may include multiple rows of module channels 118, such as stacked module channels 118 including upper and lower module channels. The receptacle cage 110 has module ports 120 that open to the module channels 118. The pluggable modules 106 are plugged into the module channels 118 through the module ports 120. Any number of module channels 118 may be provided in various embodiments. In the illustrated embodiment, the receptacle cage 110 includes four module channels 118 ganged together and arranged in a single row (4×1). In other embodiments, greater or fewer module channels 118 may be provided, such as 2×1, 3×1, 8×1, and the like. In other embodiments, the module channels 118 may be stacked, such as 2×2, 3×2, 4×2, 4×3, and the like. Optionally, multiple receptacle connectors 112 may be arranged within the receptacle cage 110, such as one within each module channel 118.

In an exemplary embodiment, the cage walls 114 of the receptacle cage 110 include exterior walls 122 and one or more interior walls 124. The exterior walls 122 form a cavity 126. The interior wall(s) 124 are located in the cavity 126 and divide the cavity 126 into the module channels 118. The interior wall(s) 124 separate the module channels 118 from each other and provide electrical shielding between the module channels 118 on either side of the interior wall 124. The exterior walls 122 provide external shielding for the module channels 118.

The exterior walls 122 include a top wall 130, a bottom wall 132, a first side wall 134, a second side wall 136, and a rear wall 138. The first and second side walls 134, 136 extend between the top wall 130 and the bottom wall 132. The bottom wall 132 may rest on the circuit board 102. However, in alternative embodiments, the bottom wall 132 may be elevated a distance above the circuit board 102 defining a gap below the bottom wall 132, such as for airflow. In other various embodiments, the receptacle cage 110 may be provided without the bottom wall 132, rather using a ground plane of the circuit board 102 to provide shielding across the bottom of the receptacle cage 110. The top wall 130, the bottom wall 132, the side walls 134, 136, and the rear wall 138 define the cavity 126. The top wall 130, the bottom wall 132, the side walls 134, 136, and the rear wall 138 define the exterior of the receptacle cage 110.

The cage walls 114 extend between a front end 140 and a rear end 142 of the receptacle cage 110. The module ports 120 are provided at the front end 140. The rear wall 138 is provided at the rear end 142. In various embodiments, a gasket 144 is provided at the front end 140, such as at the module ports 120. The gasket 144 may extend into the module channels 118 to interface with the pluggable modules 106. The gasket 144 may be configured to electrically connect to a panel or bezel.

In an exemplary embodiment, the interior walls 124 extend between the front end 140 and the rear end 142. In the illustrated embodiment, the interior walls 124 are oriented vertically. For example, the interior walls 124 are parallel to the side walls 134, 136. The interior walls 124 extend between the top wall 130 and the bottom wall 132. In an exemplary embodiment, the interior walls 124 are connected to the top wall 130, the bottom wall 132, and the rear wall 138. In various embodiments, other interior walls 124 may separate or divide the cavity 126 into upper and lower module channels 118. The channel separator may form a space between the upper and lower module channels 118, such as for airflow, for a heat sink, for routing light pipes, or for other purposes.

In an exemplary embodiment, the receptacle connector assembly 104 may include one or more heat sinks 146 for dissipating heat from the pluggable modules 106. For example, the heat sinks 146 may be coupled to the top wall 130 for engaging the upper surfaces of the pluggable modules 106. The heat sinks 146 may extend through openings in the top wall 130 to directly engage the pluggable modules 106. Hold-down clips 147 may be used to secure the heat sinks 146 to the receptacle cage 110. Other types of heat sinks may be provided in alternative embodiments.

Figure 3:
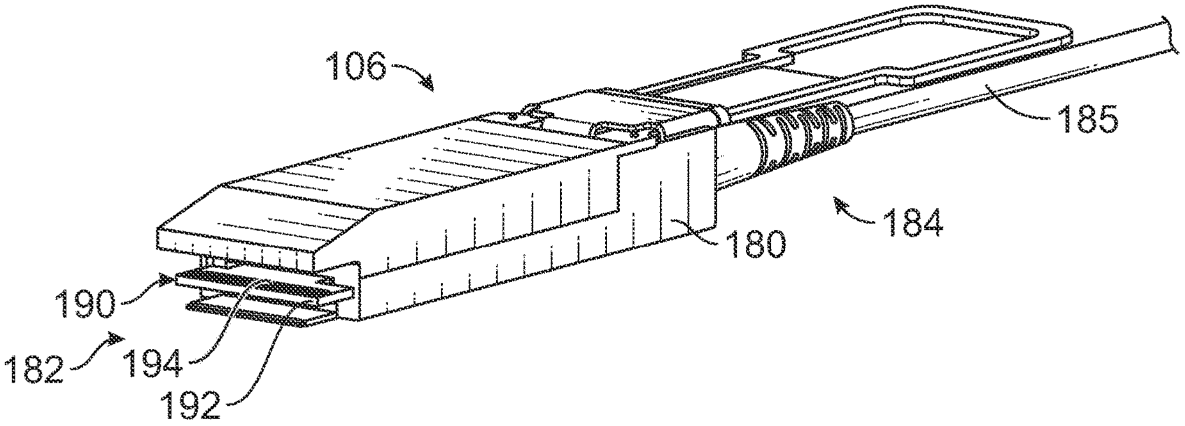
FIG. 3 is a perspective view of the pluggable module in accordance with an exemplary embodiment.

FIG. 3 is a perspective view of the pluggable module 106 in accordance with an exemplary embodiment. The pluggable module 106 has a pluggable body 180, which may be defined by one or more shells. The pluggable body 180 may be thermally conductive and/or may be electrically conductive, such as to provide EMI shielding for the pluggable module 106. The pluggable body 180 includes a mating end 182 and an opposite cable end 184. The mating end 182 is configured to be inserted into the corresponding module channel 118 (shown in FIG. 1). A cable 185 extends from the cable end 184 to another component within the system.

The pluggable module 106 includes a module circuit board 190 that is configured to be communicatively coupled to the receptacle connector 112 (shown in FIG. 1). For example, the module circuit board 190 may be plugged into the card slot of the receptacle connector 112. The module circuit board 190 is accessible at the mating end 182. The module circuit board 190 has a card edge 192 extending between a first or upper surface and a second or lower surface at a mating end of the module circuit board 190. The module circuit board 190 includes mating contacts 194, such as pads or circuits, at the card edge 192 configured to be mated with the receptacle connector 112. In an exemplary embodiment, the mating contacts 194 are provided on the upper surface and the lower surface. The module circuit board 190 may include components, circuits and the like used for operating and or using the pluggable module 106. For example, the module circuit board 190 may have conductors, traces, pads, electronics, sensors, controllers, switches, inputs, outputs, and the like associated with the module circuit board 190, which may be mounted to the module circuit board 190, to form various circuits.

In other various embodiments, the pluggable module 106 may be a circuit card rather than an I/O module. For example, the pluggable module 106 may include the module circuit board 190 without the pluggable body 180 surrounding the module circuit board 190.

In an exemplary embodiment, the pluggable body 180 provides heat transfer for the module circuit board 190, such as for the electronic components on the module circuit board 190. For example, the module circuit board 190 is in thermal communication with the pluggable body 180 and the pluggable body 180 transfers heat from the module circuit board 190. In various embodiments, the pluggable body 180 may include heat transfer fins (not shown) along at least a portion of the outer perimeter of the pluggable module 106 to transfer heat away from the main shell of the pluggable body 180, and thus from the module circuit board 190 and associated components. The fins are separated by gaps that allow airflow or other cooling flow along the surfaces of the fins to dissipate the heat therefrom.

Figure 4:
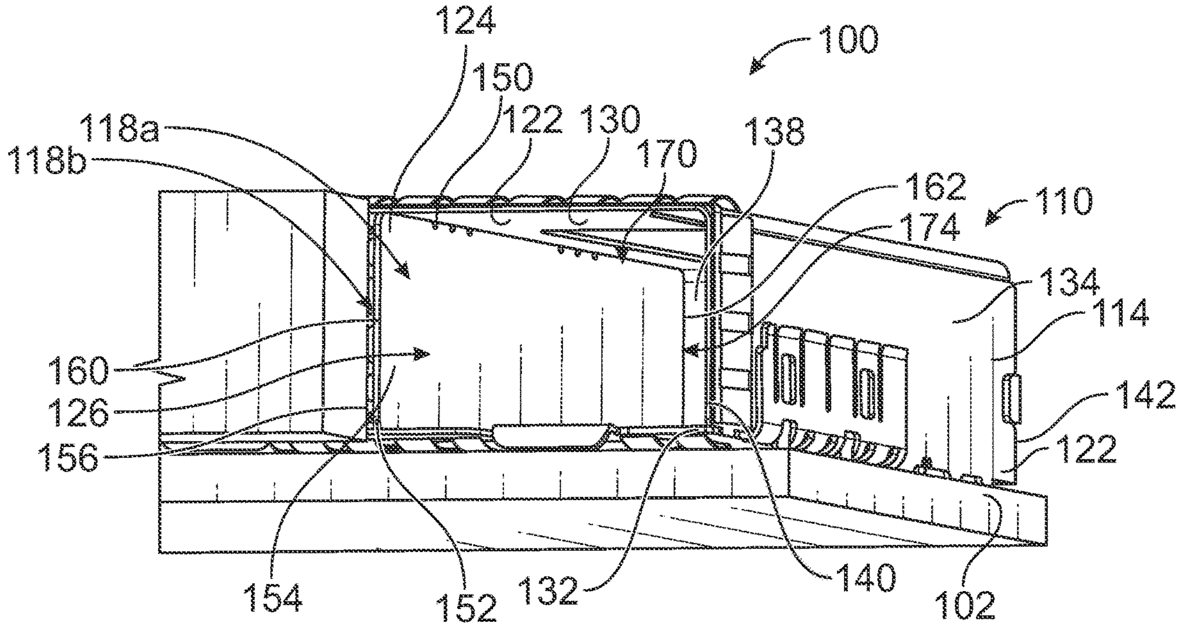
FIG. 4 is a front perspective view of a portion of the communication system showing the cavity of the receptacle cage in accordance with an exemplary embodiment.
Figure 5:
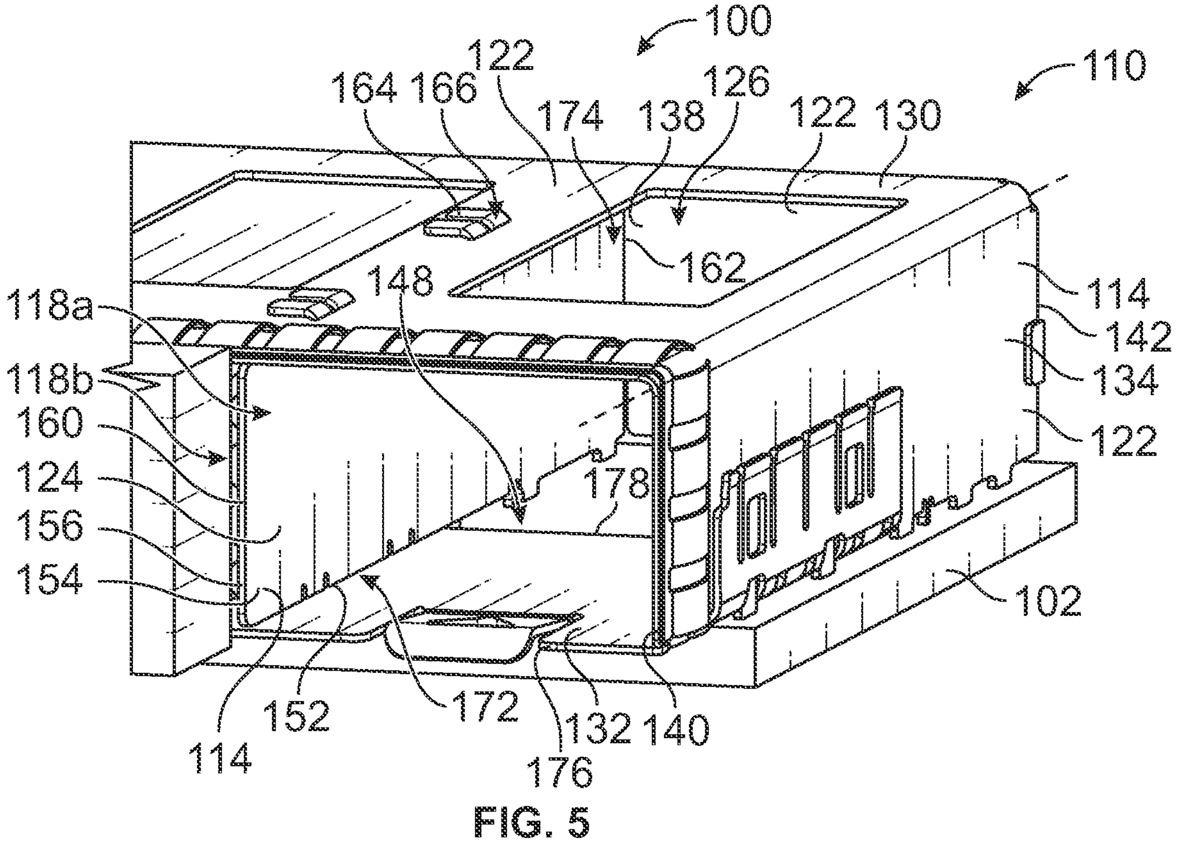
FIG. 5 is a front perspective view of a portion of the communication system showing the cavity of the receptacle cage in accordance with an exemplary embodiment.

FIG. 4 is a front perspective view of a portion of the communication system 100 showing the cavity 126 of the receptacle cage 110 in accordance with an exemplary embodiment. FIG. 5 is a front perspective view of a portion of the communication system 100 showing the cavity 126 of the receptacle cage 110 in accordance with an exemplary embodiment.

The receptacle cage 110 includes the cage walls 114 extending between the front end 140 and the rear end 142. The cage walls 114 include the exterior walls 122 and the interior wall 124. The exterior walls 122 surround and form the cavity 126. The interior wall 124 is received in the cavity 126 and divides the cavity 126 into a first module channel 118*a* at a first side of the interior wall 124 and a second module channel 118*b* at a second side of the interior wall 124. The exterior walls 122 provide external shielding for the first and second module channels 118*a*, 118*b*. The interior wall 124 provides shielding between the first and second module channels 118*a*, 118*b*.

The exterior walls 122 include the top wall 130, the bottom wall 132, the side walls 134, 136, and the rear wall 138. Optionally, some or all of the exterior walls 122 may be integral with each other. For example, in the illustrated embodiment, the top wall 130 is integral with the side walls 134, 136 and the rear wall 138 and the bottom wall 132 is separate and discrete from the other walls and coupled thereto to form the receptacle cage 110. The top and bottom walls 130, 132 extend between the side walls 134, 136. In an exemplary embodiment, the bottom wall 132 does not extend the entire length of the receptacle cage 110. For example, the bottom wall 132 stops short of the rear wall 138 such that an opening 148 is rearward of the bottom wall 132. The opening 148 is located between the bottom wall 132 and the rear wall 138. The receptacle connector 112 (shown in FIG. 1) is loaded into the cavity 126 through the opening 148. In other embodiments, the bottom wall 132 may extend to the rear wall 138 and include the opening through the bottom wall 132. For example, the bottom wall 132 does not stop at the opening 148 but rather surrounds the opening 148 along the sides and may extend along the rear of the opening 148. The rear wall 138 extends between the first and second side walls 134, 136. The rear wall 138 extends between the top wall 130 and the circuit board 102 at the bottom of the receptacle cage 110.

The interior wall 124 extends between the top wall 130 and the bottom wall 132. The interior wall 124 extends between the front end 140 and the rear end 142 of the receptacle cage 110. In an exemplary embodiment, the interior wall 124 is planar and parallel to the side walls 134, 136. The interior wall 124 includes an upper edge 150 and a lower edge 152 opposite the upper edge 150. The interior wall 124 includes a first side 154 facing the first module channel 118*a* and a second side 156 facing the second module channel 118*b*. The interior wall 124 includes a front edge 160 and a rear edge 162 opposite the front edge 160. Optionally, the interior wall 124 may be connected to the exterior walls 122 using joining tabs 164. The joining tabs 164 pass through joining openings 166 through the exterior walls 122. The joining tabs 164 may be bent or folded over to join to the exterior walls 122. In various embodiments, the joining tabs 164 may be mechanically and electrically joined, such as by welding, soldering, brazing, bonding, epoxying, or otherwise joined, to the exterior walls 122. The joint seals the joining openings 166, such as for EMI sealing.

The interior wall 124 is positioned in the cavity 126 to face the exterior walls 122. The upper edge 150 faces the top wall 130 and interfaces with the top wall 130. The lower edge 152 faces the bottom wall 132 and interfaces with the bottom wall 132. The rear edge 162 faces the rear wall 138 and interfaces with the rear wall 138. The interior wall 124 is mechanically and electrically joined to the exterior wall 122 at the interface. In an exemplary embodiment, the interior wall 124 is joined to the exterior walls 122 along substantially the entire interface between the interior wall 124 and the exterior walls 122 (for example, from front to rear or from top to bottom). The interface between the exterior and interior walls 122, 124 may include some small gaps or sections from manufacturing. However, no significant gaps or seams (for example, electrically significant based on operating frequency) are provided along the interface. In an exemplary embodiment, the interior wall 124 is mechanically joined to the exterior wall 122 along a majority of the length of the interface. In various embodiments, the interior wall 124 is mechanically joined to the exterior wall 122 along greater than 90% of the length of the interface. The interior wall 124 is sealed to the exterior walls 122 along the interfaces to prevent EMI leakage between the interior wall 124 and the exterior walls 122. For example, no significant gaps or seams (for example, electrically significant based on operating frequency) are provided between the interior wall 124 and the exterior walls 122 at the interface. In an exemplary embodiment, the interior wall 124 is conductively joined to the exterior walls 122 at the interface, such as by welding, soldering, brazing, bonding, epoxying, or other joining method. The joint at the interface may be continuous along the length or may be spot joined at intervals along the length. Spot joints provide areas of connection separated by gaps. The gaps may be small, such as to control EMI leakage through the interface. The spot joints may be at regular intervals, such as at a pitch of less than 3.5 mm. The spacing may be selected based on the operating speed and/or operating frequency of the system.

In an exemplary embodiment, the upper edge 150 is connected to the top wall 130 at an upper joint 170. The lower edge 152 is connected to the bottom wall 132 at a lower joint 172. The rear edge 162 is connected to the rear wall 138 at a rear joint 174. In an exemplary embodiment, the upper joint 170 extends the entire length of the interior wall 124 from the front edge 160 to the rear edge 162. The lower joint 172 extends the entire length of the bottom wall 132, such as from a front edge 176 to a rear edge 178 of the bottom wall 132. The rear joint 174 extends substantially the entire height of the interior wall 124 from the upper edge

150 to the lower edge 152. In an exemplary embodiment, the upper joint 170 is continuous from the front edge 160 to the rear edge 162, such as from the front end 140 to the rear end 142. The lower joint 172 is continuous from the front edge 176 of the bottom wall 132 to the rear edge 178 of the bottom wall 132. The rear joint 174 is continuous from the upper edge 150 to the lower edge 152. The joints 170, 172, 174 may be weld joints, solder joints, braze joints, conductive epoxy joints, or other types of joints. In an exemplary embodiment, the upper joint 170 and the rear joint 174 are continuous with each other transitioning from the top wall 130 to the rear wall 138. For example, the weld joint may continue from the upper joint 170 to the rear joint 174.

In an exemplary embodiment, the interior wall 124 includes the joining tabs 164 extending from the upper edge 150 and/or the lower edge 152 and/or the rear edge 162. The joining tabs 164 engages the top wall 130 and/or the bottom wall 132 and/or the rear wall 138. The joining tabs 164 may be conductively joined to the top wall 130 and/or the bottom wall 132 and/or the rear wall 138, such as by welding, soldering, brazing, bonding, epoxying, or other joining method. In various embodiments, the joining tabs 164 may be integral with one of the walls, such as the interior wall 124 or the exterior wall 122, and joined to the other wall, such as the exterior wall 122 or the interior wall 124. In other various embodiments, the joining tabs 164 may be separate and discrete from both the exterior and interior walls 122, 124 and joined to both the exterior and interior walls 122, 124. For example, the joining tabs 164 may be L-shaped tabs having one leg extending along one wall and the other leg extending along the other wall. The joining tabs 164 may be stamped and formed, such as stamped from a metal sheet and formed into the L-shape. In other embodiments, the joining tabs 164 may be a metal film or tape configured to be joined to the walls 122, 124, such as by bonding, welding, soldering, brazing, using conductive epoxy, or other joining method.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "second," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A receptacle cage for shielding electrical connections between receptacle connectors and pluggable modules, the receptacle cage comprising:

cage walls extending between a front end and a rear end of the receptacle cage, the cage walls including exterior walls and an interior wall;

the exterior walls forming a cavity, the exterior walls including a top wall, a bottom wall, a first side wall, a second side wall, and a rear wall, the top and bottom walls extending between the first and second side walls, the rear wall extending between the first and second side walls, the interior wall received in the cavity and dividing the cavity into a first module channel at a first side of the interior wall and a second module channel at a second side of the interior wall, the first and second module channels configured to receive corresponding pluggable modules, the interior wall including a front edge, a rear edge, an upper edge, and a lower edge, an upper fixed joint, wherein the upper edge is mechanically joined to the top wall at the upper fixed joint along a majority of the upper edge and the upper edge is bonded to the top wall at the upper fixed joint along a majority of the upper edge, a lower fixed joint, wherein the lower edge is mechanically joined to the bottom wall at the lower fixed joint along a majority of the lower edge and the lower edge is bonded to the bottom wall at the lower fixed joint along a majority of the lower edge, a rear fixed joint, wherein the rear edge is mechanically joined to the rear wall at the rear fixed joint along a majority of the rear edge and the rear edge is bonded to the rear wall at the rear fixed joint along a majority of the rear edge;

wherein the exterior walls provide external shielding for the first and second module channels, and wherein the interior wall provides shielding between the first and second module channels.

2. The receptacle cage of claim 1, wherein the interior wall is mechanically joined and bonded to the exterior walls at interior surfaces of the exterior walls.

3. The receptacle cage of claim 1, wherein the interior wall is welded to the exterior walls.

4. The receptacle cage of claim 1, wherein the interior wall is soldered to the exterior walls.

5. The receptacle cage of claim 1, wherein the upper edge is connected to the top wall at an upper joint, the upper joint being substantially continuous from the front end to the rear end.

6. The receptacle cage of claim 1, wherein the rear edge is connected to the rear wall at a rear joint, the rear joint being substantially continuous from the upper edge to the lower edge of the interior wall.

7. The receptacle cage of claim 1, wherein the bottom wall extends between a front edge and a rear edge, an opening being defined rearward of the bottom wall between the rear edge of the bottom wall and the rear wall, the opening is configured to receive a receptacle connector into the module channel, the lower edge of the interior wall being connected to the bottom wall at a lower joint, the lower joint being substantially continuous from the front edge of the bottom wall to the rear edge of the bottom wall.

8. The receptacle cage of claim 1, wherein the upper edge is connected to the top wall at an upper joint, the rear edge is connected to the rear wall at a rear joint, and the bottom edge is connected to the bottom wall at a lower joint, the upper joint being continuous along substantially the entire length of the upper edge, the rear joint being continuous along substantially the entire length of the rear edge, the lower joint being continuous along substantially the entire length of the bottom wall.

9. The receptacle cage of claim 8, wherein the upper joint and the rear joint are continuous with each other transitioning from the top wall to the rear wall.

10. The receptacle cage of claim 1, wherein the interior wall includes joining tabs extending from the upper edge, the lower edge, and the rear edge, the joining tabs engaging the top wall, the bottom wall, and the rear wall.

11. The receptacle cage of claim 10, wherein the joining tabs are conductively joined to the top wall, the bottom wall, and the rear wall.

12. A receptacle connector assembly comprising:

a receptacle cage including cage walls extending between a front end and a rear end of the receptacle cage, the cage walls including exterior walls forming a cavity and at least one interior wall in the cavity dividing the cavity into module channels configured to receive corresponding pluggable modules, the exterior walls including a top wall, a bottom wall, a first side wall, a second side wall, and a rear wall, the top and bottom walls extending between the first and second side walls, the rear wall extending between the first and second side walls, each interior wall including a front edge, a rear edge, an upper edge, and a lower edge, the upper edge mechanically joined to the top wall at a fixed joint along a majority of the upper edge and the upper edge is bonded to the top wall at the fixed joint along a majority of the upper edge, the lower edge mechanically joined to the bottom wall at a fixed joint along a majority of the lower edge and the lower edge is bonded to the bottom wall at the fixed joint along a majority of the lower edge, the rear edge mechanically joined to the rear wall at a fixed joint along a majority of the rear edge and the rear edge is bonded to the rear wall at the fixed joint along a majority of the rear edge; and receptacle connectors received in the module channels for electrical connection with the corresponding pluggable modules;

wherein the exterior walls provide external shielding for the module channels and the receptacle connectors received in the module channels, and wherein the at least one interior wall provides shielding within the cavity between the module channels.

13. The receptacle connector assembly of claim 12, wherein the interior wall is mechanically joined to the exterior walls along substantially the entire interface between the interior wall and the exterior walls.

14. The receptacle connector assembly of claim 12, wherein the interior wall is at least one of welded or soldered to the exterior walls.

15. The receptacle connector assembly of claim 12:

wherein the upper edge is connected to the top wall at an upper joint, the upper joint being substantially continuous from the front end to the rear end;

wherein the rear edge is connected to the rear wall at a rear joint, the rear joint being substantially continuous from the upper edge to the lower edge of the interior wall; and wherein the bottom wall extends between a front edge and a rear edge, an opening being defined rearward of the bottom wall between the rear edge of the bottom wall and the rear wall, the opening is configured to receive a receptacle connector into the module channel, the lower edge of the interior wall being connected to the bottom wall at a lower joint, the lower joint being substantially continuous from the front edge of the bottom wall to the rear edge of the bottom wall.

16. The receptacle connector assembly of claim 12, wherein the upper edge is connected to the top wall at an upper joint, the rear edge is connected to the rear wall at a rear joint, and the bottom edge is connected to the bottom wall at a lower joint, the upper joint being substantially continuous along the entire length of the upper edge, the rear joint being substantially continuous along the entire length of the rear edge, the lower joint being substantially continuous along the entire length of the bottom wall.

17. The receptacle connector assembly of claim 12, wherein the interior wall includes joining tabs extending from the upper edge, the lower edge, and the rear edge, the joining tabs engaging the top wall, the bottom wall, and the rear wall.

18. A communication system comprising:

pluggable modules each including an outer housing extending between a mating end and a cable end, the pluggable module including an upper wall and a lower wall, the pluggable module having a cavity between the upper wall and the lower wall, the pluggable module having a module circuit board in the cavity including a card edge proximate to the mating end of the outer housing; and a receptacle connector assembly including a receptacle cage and receptacle connectors received in the receptacle cage for electrical connection with the corresponding pluggable modules, the receptacle cage having cage walls extending between a front end and a rear end of the receptacle cage, the cage walls including exterior walls forming a cavity and at least one interior wall in the cavity dividing the cavity into module channels, each module channel receiving the corresponding receptacle connector, each module channel receiving the mating end of the corresponding pluggable module for mating with the receptacle connector, the exterior walls including a top wall, a bottom wall, a first side wall, a second side wall, and a rear wall, the top and bottom walls extending between the first and second side walls, the rear wall extending between the first and second side walls, each interior wall including a front edge, a rear edge, an upper edge, and a lower edge, the upper edge mechanically joined to the top wall at a fixed joint along a majority of the upper edge and the upper edge is bonded to the top wall at the fixed joint along a majority of the upper edge, the lower edge mechanically joined to the bottom wall at a fixed joint along a majority of the lower edge and the lower edge is bonded to the bottom wall at the fixed joint along a majority of the lower edge, the rear edge mechanically joined to the rear wall at a fixed joint along a majority of the rear edge and the rear edge is bonded to the rear wall at the fixed joint along a majority of the rear edge;

wherein the exterior walls provide external shielding for the pluggable modules and the receptacle connectors received in the module channels, and wherein the at least one interior wall provides shielding within the cavity between the pluggable modules and the receptacle connectors.

19. The communication system of claim 18, wherein the interior wall is mechanically joined to the exterior wall along substantially the entire interface between the interior wall and the exterior wall.

20. The communication system of claim 18, wherein the interior wall is conductively joined to the exterior walls.

* * * * *